March 16, 1965
J. L. RYAN
3,173,382
RAILROAD CAR
Filed Nov. 4, 1960
2 Sheets-Sheet 1
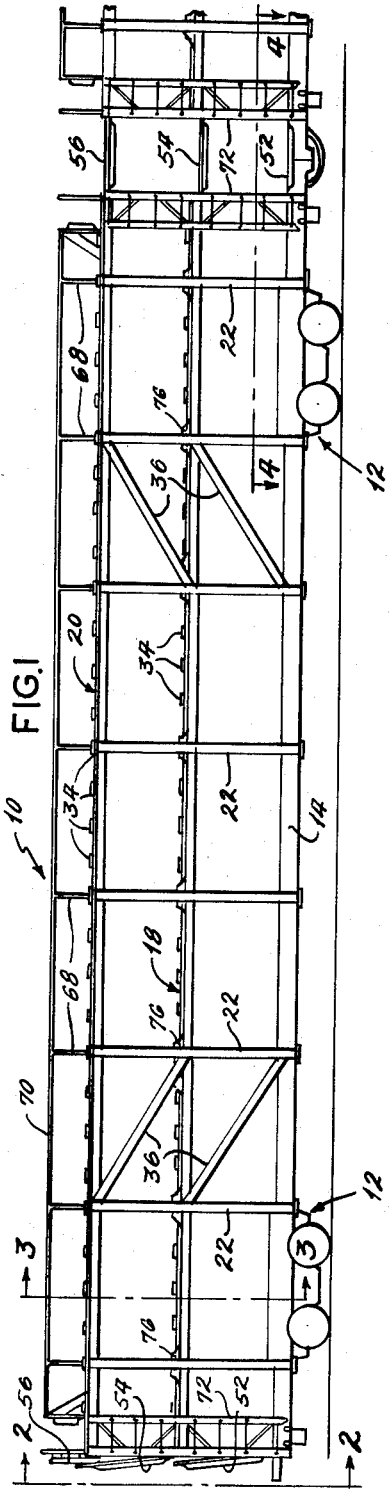
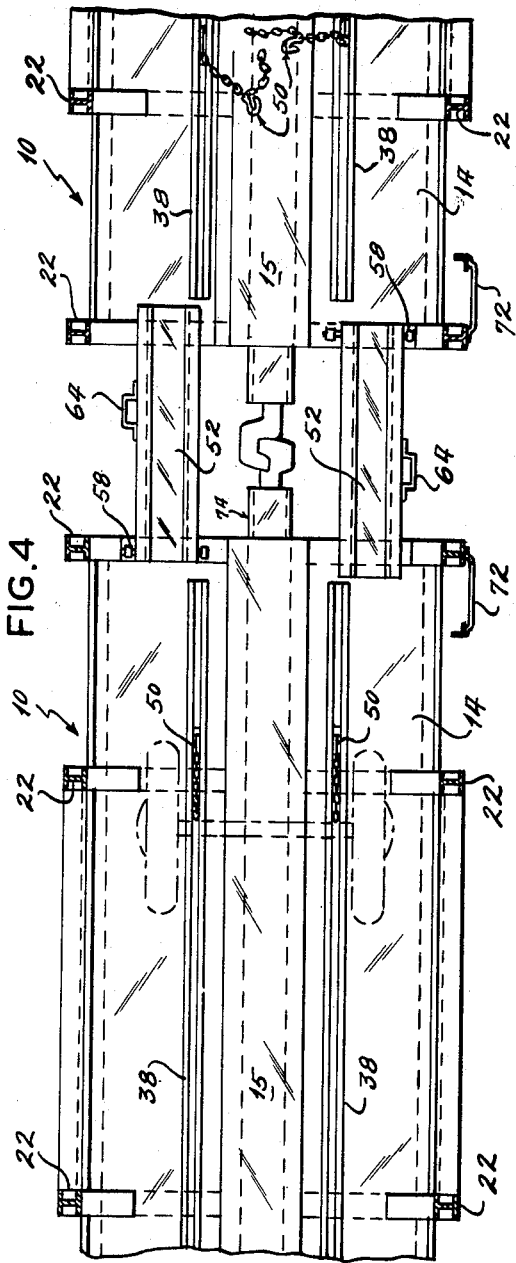
INVENTOR:
JAMES L. RYAN
BY Gravely, Lieder & Woodruff
ATTORNEYS.

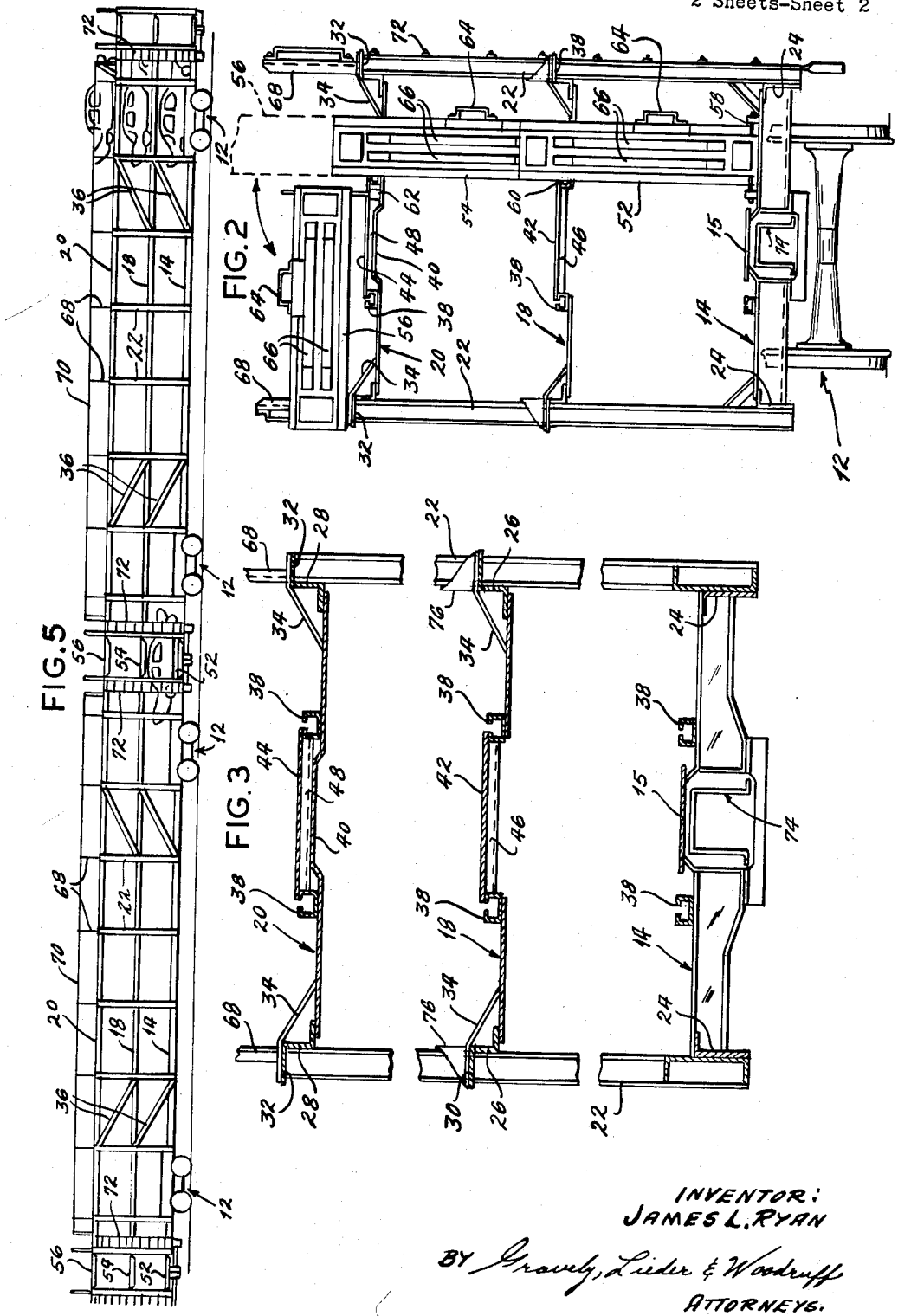

United States Patent Office 3,173,382
Patented Mar. 16, 1965

3,173,382
RAILROAD CAR
James L. Ryan, Springfield, Mo., assignor to St. Louis-San Francisco Railway Company, St. Louis, Mo., a corporation of Missouri
Filed Nov. 4, 1960, Ser. No. 67,408
4 Claims. (Cl. 105—368)

The present invention relates generally to railroad cars and more specifically to multi-tier freight cars for transporting vehicles such as automobiles and the like.

Many types of freight vehicles for transporting automobiles and other types of vehicles have been devised and constructed in the past. For the most part the known devices have included relatively complicated mechanism for loading and unliading, have included relatively complicated mechanism for supporting the vehicles during transport, have not been fully usable and compatible with other similar devices, have had relatively limited capacity, and for these and other reasons have been unsatisfactory and relatively expensive to build and operate.

These and other disadvantages of the known devices are overcome by the present invention which teaches the construction and operation of a three level railroad freight car for transporting automobiles and the like and which includes means for greatly simplifying loading and unloading, and is relatively less costly to build per unit of capacity and more economical to operate.

It is therefore a principal object of the present invention to provide less expensive means for transporting vehicles such as automobiles and the like.

Another object is to increase the capacity of freight devices used for transporting automobiles and the like.

Another object is to simplify the loading and unloading of freight devices used for carrying automobiles and the like.

Another object is to provide improved means for simultaneously loading and unloading a plurality of railroad freight transport cars.

Another object is to provide a three level railroad freight car which is adapatable for transporting vehicles such as automobiles as well as other types of freight.

Another object is to provide freight means capable of transporting substantially all known types of automobiles.

Still another object is to provide a freight car which is compatible with existing railroad equipment and which complies with the minimum standards set up for the railroad industry.

Briefly, the present device comprises a three level freight carrying railroad car having substantially open ends, open sides and an open top, an underframe with a loading platform supported on spaced railroad truck assemblies, upright means connected to the side sills of the said underframe for supporting two vertically spaced load carrying decks thereabove, each of said decks having a pair of spaced track portions extending substantially the full length of the car for accommodating the wheels of automobiles or other vehicles, means associated with the track portions for anchoring vehicles thereto, and extensions for said track portions and loading platform located at the ends of the cars, said track extensions including members hingedly mounted to the ends of the car for movement to horizontal track extending positions during loading and unloading of freight thereon.

These and other objects and advantages of the present invention will become apparent after considering the following detailed specification of a preferred embodiment in conjunction with the accompanying drawings, wherein:

FIG. 1 is a side elevational view of a railroad freight car constructed according to the present invention;

FIG. 2 is an enlarged end view of the car of FIG. 1 taken on line 2—2 thereof;

FIG. 3 is an enlarged cross-sectional view of the same car taken on line 3—3 of FIG. 1;

FIG. 4 is an enlarged fragmentary cross-sectional view taken on line 4—4 of FIG. 1 showing portions of two adjacent coupled freight cars; and FIG. 5 is a side elevational view showing portions of four coupled freight cars constructed according to the present invention.

Referring to the drawings by reference numerals, the number 10 in FIG. 1 refers generally to a railroad freight car constructed according to the present invention. The car 10 is supported on spaced railroad truck assemblies 12 and has a lower load supporting platform or deck 14 which extends substantially the full length of the car. The underframe is preferably constructed to have the load carrying surface of the platform 14 as low as possible relative to the rail and still provide required clearance over a fixed center sill cover plate 15 to clear the underneath portions of automobiles. The surface of the platform 14 outward from center sill cover plate 15 are the treadways for automobiles.

The sides of the car are constructed to provide support for cantilever second and third level load carrying tracks 18 and 20 respectively. The car sides include vertical columns or posts 22 attached at spaced locations along the sides of the car to side sills 24. Longitudinal members 26 and 28 (FIG. 3) are connected to the columns 22 along the sides of the car at the second and third levels and extend substantially the length of the car. Bar sections 30 and 32 are also attached to the columns 22 and to the longitudinal members 26 and 28 respectively and combine with the members 26 and 28 to form "Z" section elements having sufficient torsional strength to accommodate the loading. Gussets 34 are also attached between the members 26 and 28 and the associated tracks 18 and 20 at spaced locations between the columns 22. Some of the columns 22 along both sides of the car are also braced by diagonal braces or supports 36 connected therebetween as shown in FIGS. 1 and 5 to provide a side construction having required strength to resist longitudinal impacts. In some cases, however, it may be desirable to replace the diagonal braces 36 with panel bracing sections or some other suitable bracing. The longitudinal members 26 and 28 may also be formed to have cross sectional shapes other than the angular shape shown in the drawings as long as the necessary torsional strength is provided, and in some cases it may even be desirable to have the members 26 and 28 formed integral with the associated load carrying tracks 18 and 20.

The tracks for the second load carrying level 18 are supported by attachment to the lower horizontal legs of the members 26 and they have their top surfaces connected by the gussets 34 to the bar sections 30 and in some cases to the columns 22. The tracks for the third load carrying level 20 are similarly supported by attachment to the horizontal legs of the angular members 28, and they have their top surfaces connected to the bar sections 32 by the gussets 34. The load carrying levels 18 and 20 like the platform 14 are of a width to form treadways for automobiles.

All three load carrying levels 14, 18 and 20 are also provided with two spaced channel members 38 which extend substantially the full length of the car, and are included to provide means for anchoring or tying down automobiles at selected locations. The third level 20 also has cross-tie members 40 which extend substantially between selected ones of the columns 22 at opposite sides of the car and provide increased support for the structure.

The treadways for the second and third levels 18 and 20 are further connected by relatively light weight sheets 42 and 44. The sheets 42 and 44 prevent possible oil leakage from dripping or flowing onto cars on the next lower level. The sheets 42 and 44 may also be provided with stiffener ribs 46 and 48 respectively to prevent excessive drumming of the light gage sheets 42 and 44 and also to further strengthen the car.

The tie down channels 38 are provided with a plurality of tie down devices such as the devices 50 for anchoring automobiles or the like. The devices 50 have cables with means at one end for attaching to an automobile frame or spring and adjustable means at the opposite ends for attaching to the channels 38. The devices 50 are movable to suitable locations along the channels 38 depending on the size and number of automobiles to be tied down. Many different kinds of tie down devices are commercially available and can be used for this purpose, and it is not intended to limit the present invention to any particular kind.

The ends of the car 10 are provided with hinged track extensions or bridges 52, 54 and 56 at the three different load carrying levels (FIG. 2). The extensions 52 are provided for the lowest level or tracks 14 and are hinged at 58 to move between upstanding positions as shown in FIGS. 1 and 2, and horizontal positions as shown in FIGS. 1, 4 and 5. In the horizontal position the members 52 bridge the space between similar adjacent coupled cars and provide connections between tracks 14 over which automobiles can be driven when loading and unloading.

The extensions 54 for the second level are similarly hinged at 60 (FIG. 2) and are also movable between horizontal positions and vertical positions to connect and disconnect corresponding tracks on adjacent cars.

The extensions or bridges 56 for the top or third level are illustratetd with a double hinge connection 62 instead of a single hinge connection as provided for the extensions 52 and 54. This is done so that the extensions 56 will in horizontal position as shown in solid lines in FIG. 2 during transport and therefore will not increase the overall car height. The bridges 56 may also hinge similarly to the bridges 52 and 54 employed with the lower two decks by providing sliding extensions that recess to within the required height when the bridges are latched in vertical position (not shown).

It should be noted that extensions 52, 54 and 56 at each end of the car are all on the same side, but that the extensions at opposite ends of each car are on opposite sides. This is done so that all similar cars will be able to operate together, that is, when two similar cars 10 are coupled end to end the extensions are so positioned that both wheel treadways at all three levels can be made continuous therebetween (FIGS. 1 and 5). The extensions are also provided with suitable handles 64 for ease of handling and for safety reasons, and the extensions are also formed with strengthening ribs 66 on the underside (FIG. 2). The extensions may also be covered on the track forming side with suitable covering material.

Along the sides of the car at the third deck level there are also provided fences constructed by spaced posts 68 and connecting cables 70. The fences are provided for safety reasons. A suitable railroad car ladder 72 is also provided at each end of the car.

In order to load and unload automobiles on the cars 10, the cars are coupled together with one of the end cars in a position adjacent to a loading dock (not shown). The extension or bridge 52 nearest the loading dock is then lowered to a horizontal position and a similar extension or member attached to the loading dock is provided for the opposite treadway. The extensions 52, 54, and 56 between all adjacent cars 10 are also moved to their horizontal positions to connect all of the load carrying platforms of the cars. Automobiles are now driven onto the lower platform of the cars 10 and tied down by suitable devices 50 attached to the channels 38 to prevent further movement during transport. When the platform 14 on each car is loaded, a ramp which is a permanent accessory at the loading dock, is moved into position for loading the second level 18, and thereafter the uppermost platform 20. After the automobiles on the upper two levels are tied down, the extensions 52, 54 and 56 are moved to their inoperative vertical positions as shown in FIG. 2. The cars are now ready for transport. Note also that the extensions 52, 54 and 56 provide partial closures for the ends of the car during transport and in this way also serve as safety devices in case an automobile comes unfastened.

When the cars reach their destination they are unloaded in a way which is substantially similar to loading except that the automobiles are driven off of instead of onto the cars.

The subject cars have been used successfully and with considerable savings in time, cost, and machinery in the transport of large numbers of automobiles between relatively large distribution centers. To a large measure the savings have resulted because of the ease and safety with which the cars can be loaded and unloaded and also because of the greater load carrying capacity of the cars. To a large extent the greater load carrying capacity is due to the provision of a third load carrying level which has been provided without unduly adding to the overall height of the cars or increasing the height beyond acceptable railroad tolerance limitations. This has been achieved by using a cantilever type construction for the overhead platforms wherein the platform forming members themselves are relatively thin vertically and are supported from columns positioned along the sides of the cars. By being relatively thin vertically the second and third levels do not contribute substantially to the overall car height. This has not been true of any known car construction.

The very substantial increase in the load carrying capacity as compared to the known constructions including conventional automobile box cars, is also made possible through utilization of the full length of the three decks. This is to a large extent is brought about by the end loading or circus type loading of the cars. Also the cantilever construction makes it possible to load three tiers of automobiles within a height that is acceptable from a clearance standpoint and does not require speed restrictions.

The present three level car also employs a cushioned underframe construction illustrated generally by number 74. The cushioned underframe 74 absorbs shocks from switching impacts and slack runs, and furthermore permits tie down of automobiles to be made directly to the car structure. This is important and is shown generally in FIGS. 2 and 3. A suitable cushion underframe construction is shown in U.S. Patent Nos. 2,911,112 and 3,028,019 (filed February 3, 1960).

In actual cars constructed and operated according to the present invention, the bracing members 36 are connected between adjacent columns 22. To facilitate this construction and to facilitate attachment of the members 30 to the columns 22, the members 30 are formed with turned up portions 76 as shown in FIG. 1. As previously pointed out it is also contemplated to use other forms of bracing for the columns 22, although it is preferred to have the sides, ends and top of the cars as open as possible to reduce cost and to make the cars readily accessible.

Thus there has been shown and described a novel railroad auto transport freight car which fulfills all of the objects and advantages sought therefor. Briefly, the present device comprises a cushioned railroad car having a pair of spaced truck assemblies connected by a platform bed, upright means attached to the side edges of the bed for supporting two vertically spaced overhead platforms which are attached thereto using a cantilever type construction, members connected at the ends of the aforementioned bed and overhead platforms for cooperating in horizontal positions with the corresponding beds and platforms on adjacent cars or a loading platform to extend the ends of said bed and platforms between the adjacent cars and to the loading platform, said members being hinged to the associated ends for movement from the said horizontal positions to inoperative substantially vertical positions adjacent said car ends, and means for coupling said car to another car of similar or different construction.

Many changes, modifications and variations of the present device will become apparent to those skilled in the art after considering this specification and the accompanying drawings. All such changes, modifications and alterations which do not depart from the spirit and scope of the invention are deemed covered by the invention which is limited only by the claims which follow.

What is claimed is:

1. A three deck railroad freight car for transporting automobiles and the like on three levels, said car having substantially open ends, open sides and an open top, and comprising an elongated lowermost load supporting deck structure mounted on a cushion underframe structure supported on spaced wheel truck assemblies, said deck structure having side sills and a first pair of spaced longitudinally extending load supporting track members forming a first level for accommodating automobiles, said first pair of load supporting track members of said deck structure being at an elevation lower than the upper surface of the underframe construction to reduce the height of the lowermost deck, an upright superstructure fixed to each of the opposite side edges of the side sills, said superstructure including vertical columns attached at spaced locations to the side sills, two pairs of vertically spaced laterally aligned longitudinal members fastened to the inner surface of the vertical columns, each laterally aligned member having a section extending inwardly toward the other, and bar sections positioned between the vertical columns adjacent to the longitudinal members to form substantially Z shaped section members which provide torsional strength to the superstructure, a second pair of thin, laterally spaced, substantially horizontal load supporting members attached to the inwardly extending sections of the lower pair of laterally aligned longitudinal members in a cantilever attachment to the upright structures on opposite sides of the car at a predetermined height above the bed structure to form a second level of spaced track members for accommodating automobiles, upwardly extending bracing means having one end secured to the track members and the other end secured to the Z shaped members to leave the undersurface of the second pair of load supporting track members substantially unobstructed, a third pair of thin, laterally spaced, substantially horizontal load supporting members attached to the inwardly extending sections of the upper pair of laterally aligned longitudinal members in a cantilever attachment to the upright structure on opposite sides of the car at a predetermined distance above said second level to form a third level of spaced load supporting track members for accommodating automobiles, upwardly extending bracing means having one end secured to the track members and the other end secured to the Z shaped members to leave the undersurface of the third pair of load supporting track members substantially unobstructed, handrail members positioned along the longitudinal edges of the third level, means positioned along the track members on all of the levels for anchoring automobiles thereto, longitudinally directed plate members tying the innermost edges of the second and third level track members together to prevent oil leakage from the automobiles carried on the higher tracks onto automobiles on the next lower track, cross-tie members connected between laterally aligned columns at the ends of the car on the third level to provide lateral support for the superstructure, and means at the end of each of said levels for cooperating with corresponding similar means on an adjacent car to make the said three levels continuous therebetween.

2. The structure of claim 1 wherein the anchor means comprise open topped channel members positioned above the plane of the track members and extending substantially the full length of the track members adjacent to the innermost edges thereof.

3. A three deck railroad freight car for transporting automobiles and the like on three levels, said car having substantially open ends, open sides and an open top, and comprising an elongated lowermost load supporting deck structure mounted on a cushion underframe structure supported on spaced wheel truck assemblies, said deck structure having elongated side sills and a first pair of spaced longitudinally extending load supporting track members forming a first level for accommodating automobiles, said first pair of load supporting track members of said deck structure being at an elevation lower than the upper surface of the underframe construction to reduce the height of the lowermost deck, open topped channel members extending substantially the full length of the track members adjacent to the innermost edges thereof for anchoring automobiles to the track, an upright superstructure fixed to each of the opposite side edges of the side sills, said superstructure including vertical columns attached at spaced locations to the side sills, means positioned between adjacent columns for bracing therebetween, said bracing means being positioned so as to avoid interference with the driver's door of standard sized automobiles, two pairs of vertically spaced laterally aligned longitudinal members fastened to the inner surface of the vertical columns, each laterally aligned member having a section extending inwardly toward the other, and bar sections positioned between the vertical columns adjacent to the longitudinal members to form substantially Z shaped section members and provide torsional strength to the superstructure, a second pair of thin laterally spaced, substantially horizontal load supporting members attached to the inwardly extending sections of the lower pair of laterally aligned longitudinal members in a cantilever attachment to the upright structures on opposite sides of the car at a predetermined height above the bed structure to form a second level of spaced track members for accommodating automobiles, gussets extending angularly upwardly between the second pair of track members and the longitudinal members to connect the same and leave the undersurface of the second pair of track members free of obstructions, open topped channel members positioned on the top surface of the second pair of track members adjacent to the innermost edges and extending substantially the full length of the track members for anchoring automobiles to the tracks, a third pair of thin, laterally spaced, substantially horizontal load supporting members attached to the inwardly extending sections of the upper pair of laterally aligned longitudinal members to form a cantilever attachment to the upright structure on opposite sides of the car at a predetermined distance above said second level to form a third level of spaced load supporting track members for accommodating automobiles, gussets extending angularly upwardly between the third pair of track members and the longitudinal members to connect the same and leave the undersurface of the third pair of track members free of obstructions, open topped channel members positioned on the top surface of the third pair of track members adjacent to the innermost edges and extending substantially the full length thereof for anchoring automobiles to the tracks, members positioned above the track surfaces tying the innermost edges of the second and third level track members together to prevent oil leakage from the automobiles carried on the higher tracks onto automobiles on the next lower track, cross-tie members supporting the third level track members and connected between laterally aligned columns at the ends of the car on the third level to provide lateral support for the superstructure, and means at the end of each of said levels for cooperating with corresponding similar means on an adjacent car to make the said three levels continuous therebetween.

4. The freight car defined in claim 3 wherein the bridge members associated with the two track members of each level are at the opposite ends of the car, and wherein the bridge members associated with the first and second levels are hinged about a transverse axis to a substantially vertical position while the bridge members associated with the third level are hinged for movement about a transverse axis to a substantially vertical position and about a second axis to a transverse position across the end of the third level.

References Cited by the Examiner
UNITED STATES PATENTS

| | | | |
|---|---|---|---|
| 1,773,763 | 8/30 | Titren | 105—368 |
| 1,877,944 | 9/32 | Mudd | 105—375 |
| 2,052,867 | 9/36 | Cartzdafner | 105—458 |
| 2,146,203 | 2/39 | Demarest | 105—368 |
| 2,690,141 | 9/54 | King | 105—368 |
| 2,874,992 | 2/59 | Erickson | 296—1 |
| 2,901,986 | 9/59 | Furrer | 105—368 |
| 3,004,500 | 10/61 | Johnson | 105—458 |
| 3,081,716 | 3/63 | Szczepanik | 105—416 |

OTHER REFERENCES

"Railway Age" publication, Feb. 15, 1960, page 23.

MILTON BUCHLER, *Primary Examiner.*

JAMES S. SHANK, NELSON M. ELLISON, LEO QUACKENBUSH, EUGENE G. BOTZ, *Examiners.*

UNITED STATES PATENT OFFICE
CERTIFICATE OF CORRECTION

Patent No. 3,173,382 March 16, 1965

James L. Ryan

It is hereby certified that error appears in the above numbered patent requiring correction and that the said Letters Patent should read as corrected below.

Column 8, after line 12, add the following:

FOREIGN PATENTS 1,175,883    11/58    France

Signed and sealed this 24th day of August 1965.

(SEAL)
Attest:

ERNEST W. SWIDER
Attesting Officer

EDWARD J. BRENNER
Commissioner of Patents